United States Patent
Blass et al.

(10) Patent No.: US 11,818,158 B2
(45) Date of Patent: Nov. 14, 2023

(54) SYSTEMS AND METHODS FOR MANAGING NETWORK VULNERABILITY SCANNING TO AVOID DISRUPTION OF OPERATIONS

(71) Applicant: Walmart Apollo, LLC, Bentonville, AR (US)

(72) Inventors: Oscar J. Blass, Bentonville, AR (US); Micah J. Byers, Bentonville, AR (US); Derrick G. Wright, Springdale, AR (US); Clay N. Keller, Noel, MO (US)

(73) Assignee: WALMART APOLLO, LLC, Bentonville, AR (US)

( * ) Notice: Subject to any disclaimer, the term of this patent is extended or adjusted under 35 U.S.C. 154(b) by 135 days.

(21) Appl. No.: 17/080,415

(22) Filed: Oct. 26, 2020

(65) Prior Publication Data
US 2021/0058423 A1    Feb. 25, 2021

Related U.S. Application Data

(63) Continuation of application No. 16/404,300, filed on May 6, 2019, now abandoned.
(Continued)

(51) Int. Cl.
*H04L 29/06* (2006.01)
*H04L 9/40* (2022.01)
*H04L 43/16* (2022.01)

(52) U.S. Cl.
CPC .......... *H04L 63/1433* (2013.01); *H04L 43/16* (2013.01); *H04L 63/1425* (2013.01); *H04L 63/20* (2013.01)

(58) Field of Classification Search
CPC . H04L 63/1433; H04L 63/1425; H04L 63/16; H04L 63/20; H04L 63/107; H04L 63/108
(Continued)

(56) References Cited

U.S. PATENT DOCUMENTS 7,451,488 B2 ‡ 11/2008  Cooper ................. H04L 63/102
                                                                  726/2
7,624,447 B1 * 11/2009 Horowitz ............ H04L 63/0263
                                                                  726/23
(Continued)

FOREIGN PATENT DOCUMENTS

CN            104144142      ‡ 11/2014

OTHER PUBLICATIONS

PCT; App. No. PCT/US19/30396; International Search Report and Written Opinion dated Jul. 12, 2019.
(Continued)

*Primary Examiner* — Longbit Chai
(74) *Attorney, Agent, or Firm* — Fitch. Even, Tabin & Flannery LLP (57) ABSTRACT

There are provided systems and methods for managing network vulnerability scanning to avoid interference and disruption of network operations. In one form, the system includes: a network of computing devices; a network vulnerability scanner for evaluating insecurity and vulnerability of the network; a network traffic monitor for measuring the volume of network traffic at a certain time; and a scanning scheduler that includes scanning blackout events limiting operation of the scanner. Each blackout event includes an event name, a country or region for the blackout, a blackout start time and end time, and a blackout type that may include a level of the blackout and an authorization required for the network scan to proceed. In the system, a control circuit controls operation of the scanner; interrupts, delays, or cancels a network scan when the network traffic exceeds a certain threshold; and enforces blackout events according to the scanning scheduler.

20 Claims, 6 Drawing Sheets

| | search | | | | | | Action ▼ |
|---|---|---|---|---|---|---|---|
| Engine Status | Event Name ◆ | Type ◆ | Country ◆ | Start Date ◆ | End Date ◆ | Observed ◆ | Reoccurring ◆ |
| Queue Management | New Year | Focus | China | 1/1/2016 | 1/3/2016 | ☑ | ☑ — 302 |
| Engine Management | Christmas | Lockdown | US | 12/24/2016 | 12/26/2016 | ☑ | ☑ — 304 |
| Asset Groups | Store Window | Scan Window | US | 2300 | 0700 | ☑ | ☑ — 306 |
| Blackout Dates | | | | | | | |
| Network Management | | | | | | | |
| History | | | | | | | |

308

300

Related U.S. Application Data (60) Provisional application No. 62/667,965, filed on May 7, 2018.

(58) Field of Classification Search
USPC .......................................................... 726/25
See application file for complete search history.

(56) References Cited

U.S. PATENT DOCUMENTS

| | | | | | |
|---|---|---|---|---|---|
| 8,181,245 | B2* | 5/2012 | Tripathi | .............. | H04L 63/1441 |
| | | | | | 713/188 |
| 8,661,126 | B2‡ | 2/2014 | Cole | ........................ | H04L 41/12 |
| | | | | | 709/22 |
| 9,438,634 | B1‡ | 9/2016 | Ross | ........................ | H04L 63/20 |
| 2002/0104014 | A1‡ | 8/2002 | Zobel | .................. | H04L 63/1425 |
| | | | | | 726/26 |
| 2005/0010821 | A1‡ | 1/2005 | Cooper | .............. | H04L 63/1433 |
| | | | | | 726/4 |
| 2006/0075503 | A1‡ | 4/2006 | Bunker | ................. | G06F 11/324 |
| | | | | | 726/25 |
| 2006/0085852 | A1* | 4/2006 | Sima | ..................... | G06F 21/577 |
| | | | | | 726/22 |
| 2009/0113551 | A1‡ | 4/2009 | Lee | ..................... | H04L 63/1433 |
| | | | | | 726/25 |
| 2012/0144493 | A1* | 6/2012 | Cole | ................... | H04L 63/0218 |
| | | | | | 726/25 |
| 2014/0026122 | A1* | 1/2014 | Markande | ........... | G06F 11/3688 |
| | | | | | 717/124 |
| 2015/0161390 | A1* | 6/2015 | Xuan | ...................... | G06F 21/54 |
| | | | | | 726/22 |
| 2019/0342325 | A1 | 11/2019 | Blass | | |

OTHER PUBLICATIONS

Rajappa, Madhusudhan; "Assess the vulnerability of an enterprise's applications and network"; https://www.ibm.com/developerworks/library/se-assess-vulnerability-enterprise-applications-network-trs/index.html; Aug. 23, 2016; pp. 1-13.

U.S. Appl. No. 16/404,300; Notice of Allowance dated Jul. 28, 2020, (pp. 1-9).

U.S. Appl. No. 16/404,300; Office Action dated Apr. 3, 2020; (pp. 1-15).

U.S. Appl. No. 16/404,300; Office Action dated Dec. 30, 2019; (pp. 1-13).

\* cited by examiner
‡ imported from a related application

Scan Blackout Types

| Type | Description |
|---|---|
| Awareness | Change awareness. By default scans will run during this event. |
| Focus | Change focus. By default scans will not run during this event. |
| Lockdown | Change Lockdown. All scans are to cease during this event. |
| ICE | Changes have been frozen for the department. Scans are to cease during this event. |
| Scan Window | A period during which the scan can execute. |

202 — Awareness
204 — Focus
206 — Lockdown
208 — ICE
210 — Scan Window

*FIG. 3*

| Engine Status | | | | | | | |
|---|---|---|---|---|---|---|---|
| Queue Management | 🔍 search | | | | | | Action ▼ |
| Engine Management | Event Name ◆ | Type ◆ | Country ◆ | Start Date ◆ | End Date ◆ | Observed ◆ | Reoccurring ◆ |
| Asset Groups | New Year | Focus | China | 1/1/2016 | 1/3/2016 | ☑ | ☑ |
| Blackout Dates | Christmas | Lockdown | US | 12/24/2016 | 12/26/2016 | ☑ | ☑ |
| Network Management | Store Window | Scan Window | US | 2300 | 0700 | | |
| History | | | | | | | |

SYSTEMS AND METHODS FOR MANAGING NETWORK VULNERABILITY SCANNING TO AVOID DISRUPTION OF OPERATIONS

CROSS-REFERENCE TO RELATED APPLICATIONS

This application is a continuation application of U.S. application Ser. No. 16/404,300, filed May 6, 2019, which claims the benefit of U.S. Provisional Application No. 62/667,965, filed May 7, 2018, both of which are incorporated by reference in their entirety herein.

TECHNICAL FIELD

This invention relates generally to scanning of computer networks, and more particularly, to scanning computer networks to determine vulnerabilities and insecurities.

BACKGROUND

In the retail setting, computer networks are relied on for the functioning of retailer operations. Shopping facilities, product distribution centers, and other retail entities rely on networks of computer devices with applications running on the devices to facilitate their retail activities. For example, online and in-store shopping requires proper functioning of a retailer's computer networks in order to enable customers to make purchases in an easy and convenient manner. In order for continued operation of the retailer's computer networks, these networks must be periodically scanned by a network vulnerability scanner in order to identify and neutralize potential points of the networks that may be insecure and subject to improper action by outside actors. These concerns also apply to other non-retail operations, such as, for example, air traffic control systems.

Accordingly, it is desirable to develop an approach where network vulnerability scanning can be conducted without interference and disruption of retailer and other operations. In some circumstances, scanning can cause networks to crash or to otherwise be improperly affected. Entities seek to avoid such adverse impact on their networks when these networks are especially needed, such as during peak times for online and in-store shopping by customers. It is therefore desirable to apply an approach where scanning can be conducted to address network vulnerabilities while simultaneously seeking to minimize the disruption of networks.

BRIEF DESCRIPTION OF THE DRAWINGS

Disclosed herein are embodiments of systems, apparatuses and methods pertaining to managing network vulnerability scanning to avoid interference and disruption of ongoing operations. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for managing network vulnerability scanning to avoid interference and disruption of network operations. In one form, the system comprises: a network comprising a plurality of communicatively coupled computing devices with applications running thereon; a network vulnerability scanner configured to evaluate insecurity and vulnerability of the network to disruption by outside actors; a network traffic monitor configured to measure the volume of traffic being transferred across the network at a certain point in time; a scanning scheduler comprising a plurality of scanning blackout events limiting operation of the network vulnerability scanner, each scanning blackout event including an event name, an applicable country or region for the blackout, a blackout start time, a blackout end time, and a blackout type indicating at least one of: a predetermined level of the blackout in the country or region and a predetermined authorization required for the network scan to proceed. The system further comprises a control circuit operatively coupled to the network vulnerability scanner, network traffic monitor, and the scanning scheduler, the control circuit configured to: control operation of the network vulnerability scanner; interrupt, delay, or cancel a network scan by the network vulnerability scanner when the network traffic measured by the network traffic monitor exceeds a predetermined threshold; and enforce scanning blackout events according to the scanning scheduler.

In some implementations, the network traffic monitor measures daily traffic in one or more countries or regions; the control circuit determines whether the measured daily traffic in the one or more countries or regions exceeds predetermined thresholds for those one or more countries or regions; and the control circuit creates a scanning blackout event for those one or more countries or regions on anniversaries of the dates where the measured daily traffic exceeded the predetermined thresholds. In some implementations, the control circuit receives input that a network scan disrupted network operations on a certain date in a country or region; and the control circuit creates a scanning blackout event in that country or region on anniversaries of that certain date. In some implementations, the predetermined level of a blackout comprises one or more of: all network scans allowed, only manually inputted and non-recurring network scans allowed, network scans only permitted for certain departments or portions of the network being scanned, and all network scans blocked. In some implementations, the predetermined level of a blackout is one selected from a group of levels; each blackout type indicates the predetermined level of the blackout for each country or region; and each blackout type further requires a predetermined authorization for the network scan to proceed, the predetermined authorization corresponding to the predetermined level in each country or region. In some implementations, following interruption, delay, or cancellation of a network scan when measured network traffic exceeds a predetermined threshold: the network traffic monitor is configured to continue measuring the volume of traffic being transferred across the network at predetermined time intervals; and the control circuit is configured to initiate a network scan when both the volume of traffic no longer exceeds the predetermined threshold and the scanning scheduler does not indicate a blackout event. In some implementations, the network traffic monitor is configured to measure the volume of traffic being transferred across a network at predetermined time intervals for a predetermined country or region; the control circuit is configured to determine a rate in the change of the volume of traffic; and the control circuit is configured to interrupt, delay, or cancel a network scan when the rate in the change of the volume of traffic exceeds a predetermined threshold rate. In some implementations, the network vulnerability scanner performs at least one of the operations of accessing files, querying network ports, and performing login actions. In some implementations, the network vulnerability scanner is further configured to evaluate insecurity and vulnerability by: scanning nodes using login credentials on the network; performing a plurality of measurements indicating usage capacity on a node or on the network; and determining one or more of conflicting application operations, misconfigurations of the applications, and internal application vulnerabilities. In some implementations, the scanning blackout events comprise one or more of peak business hours, predetermined holidays, and historical times of peak network transactions.

In another form, there is provided a method for managing network vulnerability scanning to avoid interference and disruption of network operations, the method comprising: providing a network comprising a plurality of communicatively coupled computing devices with applications running thereon; providing a network vulnerability scanner configured to evaluate insecurity and vulnerability of the network to disruption by outside actors; providing a network traffic monitor configured to measure the volume of traffic being transferred across the network at a certain point in time; and creating a scanning scheduler comprising a plurality of scanning blackout events limiting operation of the network vulnerability scanner, each scanning blackout event including an event name, an applicable country or region for the blackout, a blackout start time, a blackout end time, and a blackout type indicating at least one of: a predetermined level of the blackout in the country or region and a predetermined authorization required for the network scan to proceed. The method further comprises, by a control circuit: controlling operation of the network vulnerability scanner; interrupting, delaying, or canceling a network scan by the network vulnerability scanner when the network traffic measured by the network traffic monitor exceeds a predetermined threshold; and enforcing scanning blackout events according to the scanning scheduler.

Figure 1:
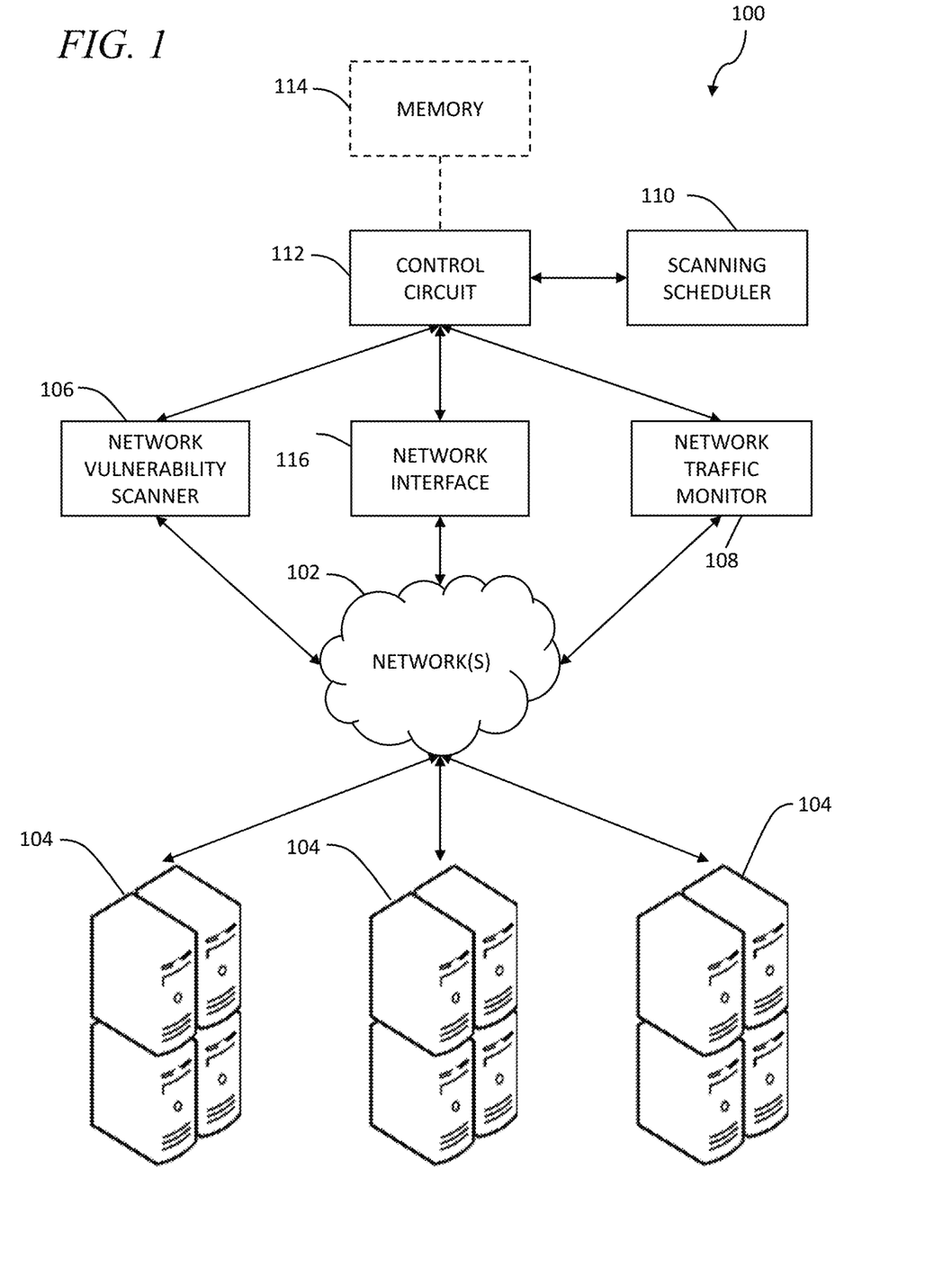
FIG. 1 is a block diagram in accordance with some embodiments.

Referring to FIG. 1, there is shown a system 100 for managing vulnerability scanning of a network 102 of computing devices 104. It is desirable to conduct regular scans of network(s) 102 in order to prevent improper intrusions by outside actors, such as, for example, hacking of the network 102 or other sorts of unauthorized intrusions by hostile actors. In the retailer context, it has been found that care must be taken as to the timing and extent of these scans because they may reduce the speed of the network 102 or, in rare drastic circumstances, cause the network 102 to crash. So, for example, it may be desirable to conduct the scans at off-peak online and in-store sales times to avoid sales disruptions. Accordingly, the system 100 manages network scanning to minimize interference and disruption of retailer operations.

So, in one aspect, this disclosure is directed generally to the scheduling of network vulnerability scanning at off-peak times so as not to interfere with retailer operations. Network vulnerability scanning is used to determine if computers or devices within an organization are running software which is insecurely configured or that contains vulnerabilities. During these scans, files are accessed, network ports are queried, and a login action may occur. Although most network vulnerability scanners have non-intrusive modes, some software does crash when probed. This intrusion can lead to downtime and loss in sales and productivity. Without a blackout protocol, there is a greater chance of monetary loss when performing scans that may be required for compliance with security regulations.

In this regard, it should be understood that the computing devices may interface with customers, and the disruption of these devices may cause considerable frustration and irritation on the part of customers. For example, customer facing aspects of a system may include devices such as, without limitation, self-checkout stations, point-of-sale endpoints/stations, photo kiosks, etc. In the retail setting, it is desirable to avoid any interference with or disruption of the normal operation of such devices, which may lead to customer annoyance and possible loss of customers. Uptime is critical during peak usage times and especially for such customer-facing components and devices.

Although this disclosure addresses, in part, managing network vulnerability scanning to avoid interference and disruption of retailer operations, it should also be understood that it also extends to non-retail operations. Essentially, this disclosure may apply to any subject matter where the control of scanning is useful to avoid interference with and the disruption of ongoing operations. One non-retail example where this disclosure might be applied is to an air traffic control system. It would be desirable to avoid vulnerability scanning during certain days and times, such as, without limitations, certain holidays and/or dates with high volume of air traffic. A second non-retail example is a video streaming service. Again, it would be desirable to avoid vulnerability scanning during certain high volume periods of video streaming, such as, without limitation, weekends. A third non-retail example might be applied to the military. If the status of certain armed forces is elevated to a higher state of readiness, it would be desirable to avoid vulnerability scanning of military systems to make certain that such systems are not disrupted. As should be evident, there are numerous non-retail examples to which this disclosure may be applied, and this disclosure should not be understood to be limited to the retail setting.

The system 100 includes a network 102 that includes a number/collection of computing devices 104 communicatively coupled to the network 102 and with applications running thereon. In some forms, the network 102 may, for example, be a store network, a product distribution center network, and a regional network including a number of stores and/or product distribution centers. It is generally contemplated that the system 100 may be simultaneously managing a large number of separate networks 102 located in different countries, and scans will need to be conducted of these networks 102 at different times and to different extents.

The system 100 further includes a network vulnerability scanner 106 that evaluates insecurity and vulnerability of the network 102 to disruption by outside actors. In one form, the scanner 106 will generally probe and query the network 102 from outside the network 102 to check vulnerability to unauthorized access. For example, in one form, the scanner may perform such operations as attempting to access network files, querying network ports, and seeking to perform login actions. Some examples of network vulnerability scanning tools and software are provided by McAfee, Tenable, and IBM.

In another form, the network vulnerability scanner 106 may also probe and query the network from inside the network 102, and the scanner 106 may also scan nodes using login credentials on the network 102. In this form, the scanner 106 may evaluate insecurity and vulnerability by: scanning nodes using login credentials on the network 102; performing measurements indicating usage capacity on a node or on the network 102; and determining conflicting application operations, misconfigurations of the applications, and/or internal application vulnerabilities.

The system 100 also includes a network traffic monitor 108 for measuring the volume of traffic being transferred across the network 102 at a certain point in time. It is generally contemplated that, as an initial prerequisite, a scan will not be conducted if the network 102 is experiencing a volume of traffic above a certain threshold. In this circumstance, it is desirable to delay the scan so as to avoid the risk of disrupting this high network traffic. As one example, this high volume of network traffic may represent a high volume of online browsing and sales transactions.

The network traffic monitor 108 may measure the volume of network traffic in a variety of ways. It is generally contemplated that network traffic can be measured using either active or passive techniques and through the use of any of a variety of well-known software tools. For example, network traffic may be measured by techniques such as router-based monitoring techniques, data packet capture and analysis, simple network management protocol, and/or the measurement of bandwidth use on individual computing devices and routers. It is contemplated that a general real time estimate of the volume of network traffic will be sufficient and that a precise measurement of network traffic is not required.

In addition, the system 100 includes a scanning scheduler 110 with a number of scanning blackout events that limit operation of the network vulnerability scanner 106. Each of the scanning blackout events includes an event name, an applicable country or region for the blackout, a blackout start time, and a blackout end time. Each scanning blackout event further includes: the level or extent of the blackout of the network 102, the authorization required for a certain network scan to proceed, and possibly a combination of level of blackout and required authorization. Some examples of blackout events where scans may be limited may include: peak business hours at stores in the network 102, certain holidays that may be associated with and known for high online and in-store sales or other high network traffic, and historical times of peak transactions. Additional examples of and details regarding blackout events are addressed further below.

The system 100 further includes a control circuit 112 that is operatively coupled to the network vulnerability scanner 106, network traffic monitor 108, and the scanning scheduler 110 and that controls the general operation of the system 100. As described herein, the language "control circuit" refers broadly to a system including any microcontroller, computer, or processor-based devices with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 112 may be configured (for example, by using corresponding programming stored in a memory as will be well understood by those skilled in the art) to carry out one or more of the steps, actions, and/or functions described herein.

The control circuit 112 may be coupled to a memory 114 and may be coupled to the network 102 by a network interface 116. The memory 114 can, for example, store non-transitorily computer instructions that cause the control circuit 112 to operate as described herein, when the instructions are executed, as is well known in the art. Further, the network interface 116 may enable the control circuit 112 to communicate with other elements (both internal and external to the system 100). This network interface 116 is well understood in the art. The network interface 116 can communicatively couple the control circuit 112 to the network 102 being scanned and whatever other network or networks may be appropriate for the circumstances. In one form, it is contemplated that the control circuit 112 will access the blackout events in the scanning scheduler 110 and may access one or more databases to collect data for performing its functions.

In the system 100, the control circuit 112 controls the operation of the network vulnerability scanner 106. It interrupts, delays, or cancels a network scan by the scanner 106 when the network traffic measured by the network traffic monitor exceeds a certain threshold. So, if the network traffic is too high, the scan will not proceed. In addition, the control circuit 112 enforces the scanning blackout events according to the scanning scheduler 110. So, for example, the control circuit 112 may allow a partial or complete scan to proceed to the extent permitted by the scanning scheduler 110 if not completely blacked out and if the required authorization (if any) has been provided.

Figure 2:
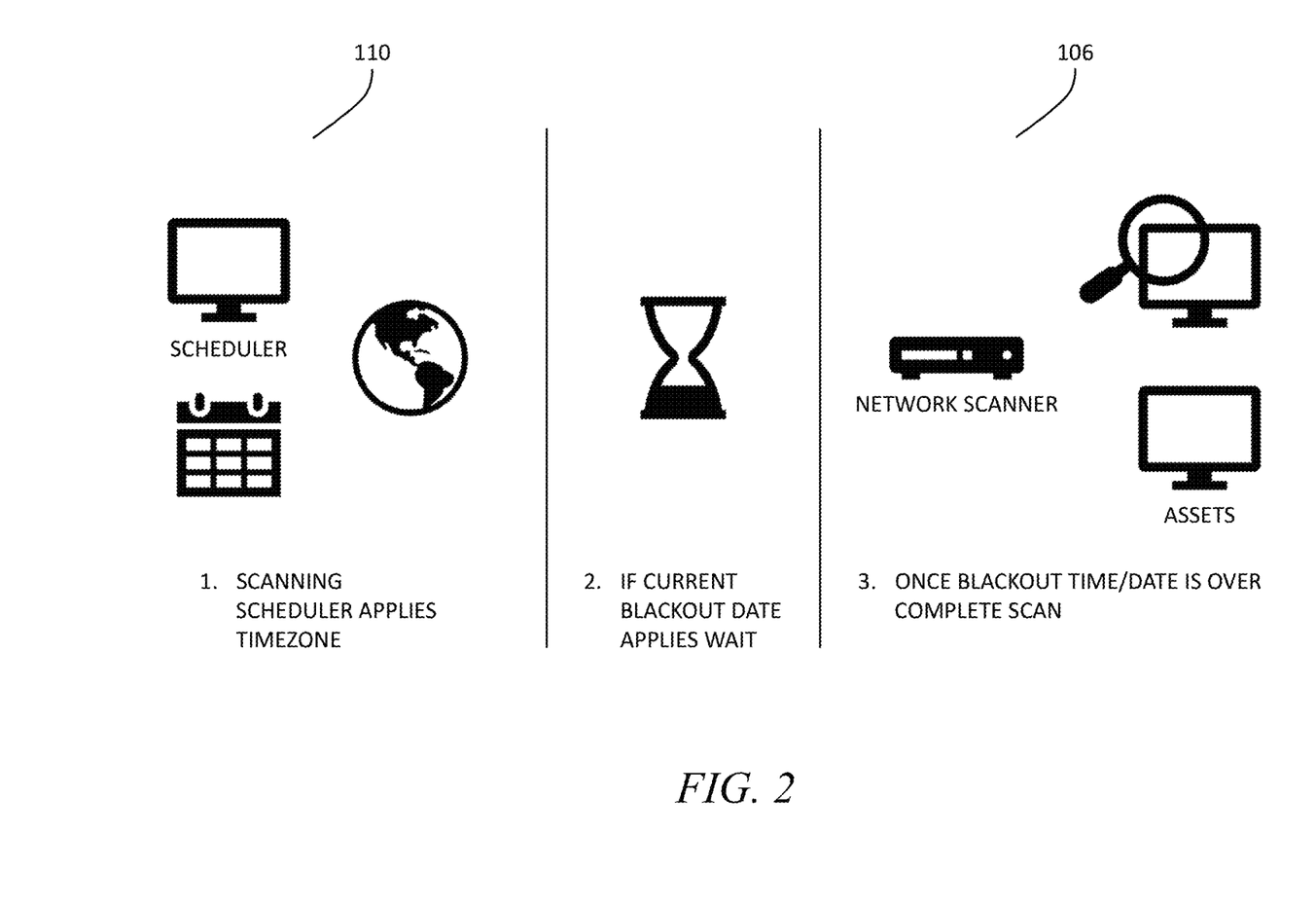
FIG. 2 is a schematic diagram in accordance with some embodiments.

FIG. 2 shows a schematic of a simple example of application of system 100. In this example, the control circuit 112 inspects the blackout events on the scanning scheduler 110 and applies the correct time zone of the network 102 to be scanned. Next, if the control circuit 112 determines that a blackout date applies to that particular network 102 (i.e., a complete blackout of scans for the entire day), the scan is delayed until the next appropriate date without a blackout. Then, once the blackout date is over (and assuming the next day is not also a complete blackout), the scan can proceed.

As another example, a scan may be rescheduled upon detection of a high volume of network traffic, such as, for instance, may indicate a high volume of online and in-store sales. For example, if the measured traffic is at 99% of saturation, a blackout may be created. If a network scan is delayed or stopped due to high network traffic, the system 100 proceeds with the scan at the next appropriate time (i.e., sufficiently low network traffic and no scheduled blackout date). In one form, following interruption, delay, or cancellation of a network scan when measured network traffic exceeds a certain threshold or limit, the network traffic monitor 108 may be configured to continue measuring the volume of traffic being transferred across the network at certain time intervals (such as, for example, hourly or daily); and the control circuit 112 may be configured to initiate a network scan when both the volume of traffic no longer exceeds the threshold/limit and the scanning scheduler 110 does not indicate a blackout event.

Alternatively, or in addition, a scan may be rescheduled upon detection of a high rate of change of network traffic (i.e., a rapid increase in network traffic). So, a network scan may be delayed or stopped, when the rate of change in network traffic is determined to be too high. In one form, the network traffic monitor 108 may be configured to measure the volume of traffic being transferred across a network at certain time intervals for a certain country or region, the control circuit 112 may be configured to determine or calculate a rate in the change of the volume of traffic (based on multiple measurements over a certain time interval); and the control circuit 112 may be configured to interrupt, delay, or cancel a network scan when the rate in the change of the volume of traffic exceeds a certain threshold rate.

It is generally contemplated that the blackout events may be established in various ways. In one form, some or all of the blackout events may be inputted manually based on certain categories or classifications like peak business hours at retail and/or online stores, known high volume shopping holidays (such as the Friday after Thanksgiving in the United States and the following Monday), and historical times of peak transactions. It is also generally contemplated that the scanning scheduler 110 may be updated in a continual and iterative manner to add blackout events to the scanning scheduler 110 (and fine tune those events already added).

Further, it is contemplated that blackout events may be added or revised by an automated process. For example, the control circuit 112 may set up a recurring blackout anniversary date when it experiences a high volume of traffic on a certain date. So, a blackout date may be set for the following year. In other words, the network traffic monitor 108 may measure daily traffic in one or more countries or regions, the control circuit 112 may determine whether the measured daily traffic in the one or more countries or regions exceeds certain thresholds or limits for those countries or regions; and the control circuit 112 may create a scanning blackout event for those countries or regions on anniversaries of the dates where the measured daily traffic exceeded the predetermined thresholds/limits. As another example, the control circuit 112 may set up a recurring blackout anniversary date when a disruption of operations is reported for a certain date. In other words, the control circuit 112 may receive input that a network scan disrupted operations on a certain date in a country or region, and the control circuit 112 may create a scanning blackout event in that country or region on anniversaries of that date. Conversely, the network traffic monitor may measure certain historical periods and data when there is low network usage, and blackout events may be created to identify these time periods as preferred times for network scans.

In other forms, blackout events may be added or revised based on a machine learning approach. For example, the system 100 may use a supervised learning approach in which it infers weights to be given to inputted factors based on several examples. Each example includes a set of inputs and a known output value (i.e., a high volume of network traffic). A supervised learning algorithm analyzes the examples (or past inputs and corresponding outputs) and generates an inferred function, which can be used to predict new examples (i.e., to predict an output based on new inputs). In this form, the supervised learning approach may employ a training session with illustrative examples during which inputs based on various factors are compared to the actual output (i.e., actual volume of network traffic vs. predicted network traffic for certain dates in certain countries/regions).

Figure 3:
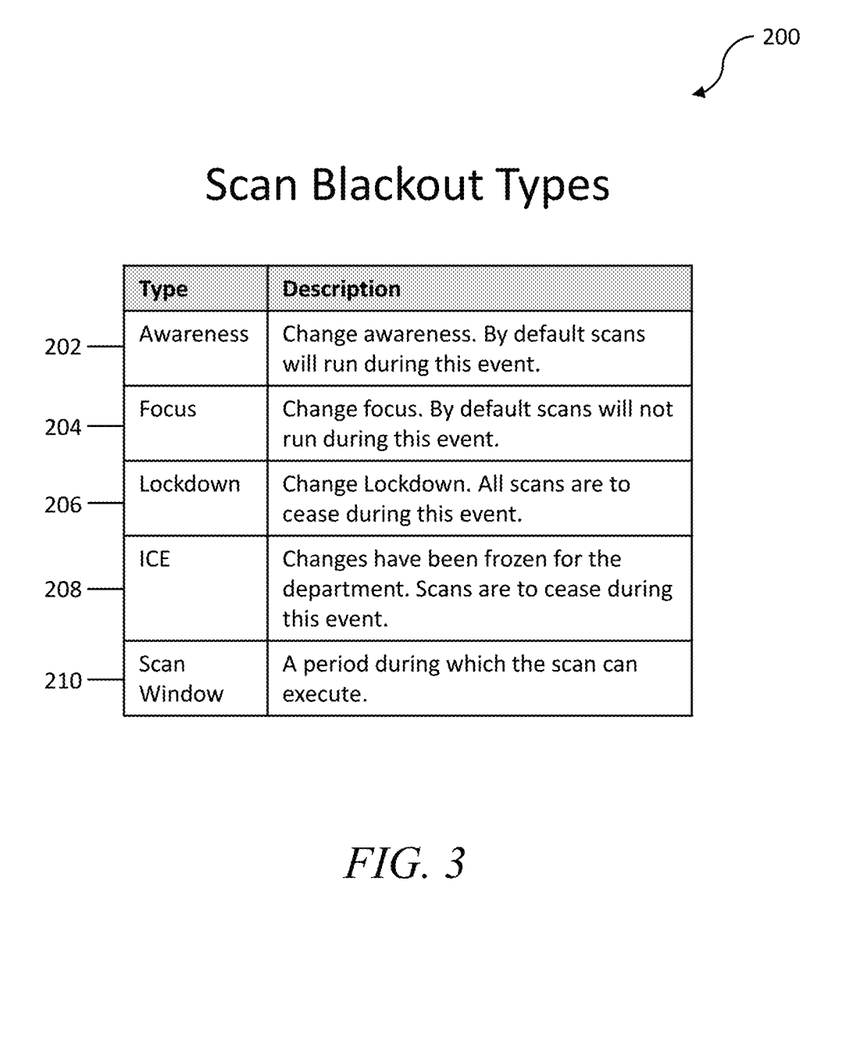
FIG. 3 is a table in accordance with some embodiments.

FIG. 3 shows a table 200 of different types of blackouts. It is generally contemplated that a scheduled blackout need not be a complete blackout but instead may be some form of partial blackout. For example, in FIG. 3, five types of blackout scans are shown along with an accompanying description, but it should be understood that numerous other types of blackout scans are possible. In the table, the first type of blackout type is labeled "awareness" 202. Under this blackout type, scans will generally run during this event by default. So, this blackout type may be the lowest level of blackout such that all or most scans will run during this event. A second type of blackout type is labeled "focus" 204. Under this blackout type, scans will generally not run during this event by default. This blackout type may be an intermediate level of blackout that may be overridden by an individual with the required degree of authorization. A third type of blackout type is labeled "lockdown" 206. Under this blackout type, all scans are to cease during this event. As suggested by the label, this blackout event may be a high level of blackout such that it may not be overridden generally (or may only be overridden by an individual with a very high degree of authority). A fourth type of blackout level is labeled "ICE" 208. Under this blackout type, changes have been frozen for a department, and scans are to cease during this event. In one form, this blackout may be a partial blackout that only impacts a department (or portion of a network 102) and not the entire network 102. Alternatively, if changes have been frozen for the department, scans of the entire network 102 may cease, regardless of which network 102 now includes that department (i.e., any addition or change of network to include the department will not circumvent the restriction on scanning). A fifth type of blackout type is labeled "scan window" 210. This blackout type indicates a time period during which the scan can execute. This blackout may be a partial blackout that only covers a certain portion of the day (such as business hours with high online sales or peak business) and that allows scans during other time periods during the day.

Other examples of blackout levels and authorizations (and combinations thereof) are available. For instance, regarding blackout levels and extent of blackouts, these levels may include levels where all network scans are allowed, where only manually inputted and non-recurring network scans are allowed, where network scans are only permitted for certain departments or portions of the network being scanned, and where all network scans blocked. Further, it is generally contemplated that these levels may stand by themselves or may be coupled to a requisite degree of authorization. So, in one form, different degrees of authorizations (and/or authorization by different individuals) may be required to proceed with a network scan for different levels of blackouts. In other words, the predetermined level of a blackout may be selected from a group of levels, each blackout type may indicate the predetermined level of the blackout for a country or region, and each blackout type may further require a certain authorization for the network scan to proceed with that authorization corresponding to the predetermined level in the country or region.

Figure 4:
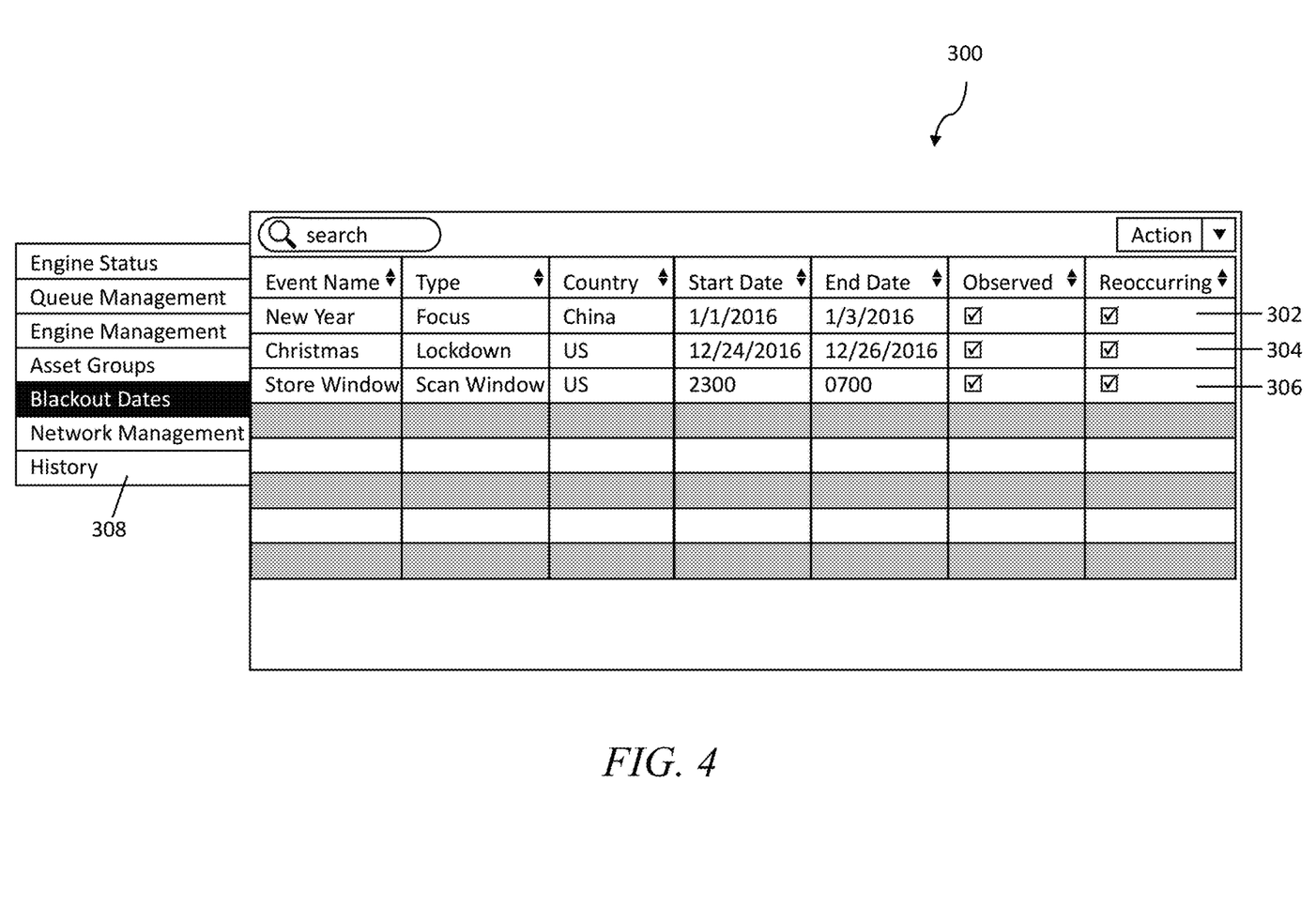
FIG. 4 is a portion of a screenshot in accordance with some embodiments.

FIG. 4 shows an example of a portion of a screenshot 300 with information for multiple blackout events. As can be seen, in this example there are three blackout events in two different countries: New Year in China (302), Christmas in the United States (304), and an event labeled "Store Window" in the United States (306). Each of these three events have been assigned a different blackout type and start and end times. The first two events are each assigned a start date and an end date. Because the third event is a "scan window" blackout type, it specifies a start time (23:00 or 11:00 pm) and an end time (07:00 or 7:00 am), rather than start and end dates. Each of these events are also marked as recurring events so that the same scanning blackout is applied to each occurrence of these events. The user may trigger pull down menus to allow the user to access other selections of events, blackout types, countries, start and end dates, etc. In this example, the user is also permitted to toggle to and access other options in a window 308, such as, without limitation, "Asset Groups" and "Network Management." In one form, for instance, these other options may allow switching between different networks and may allow control and management of the departments and computing devices included in various networks.

Figure 5:
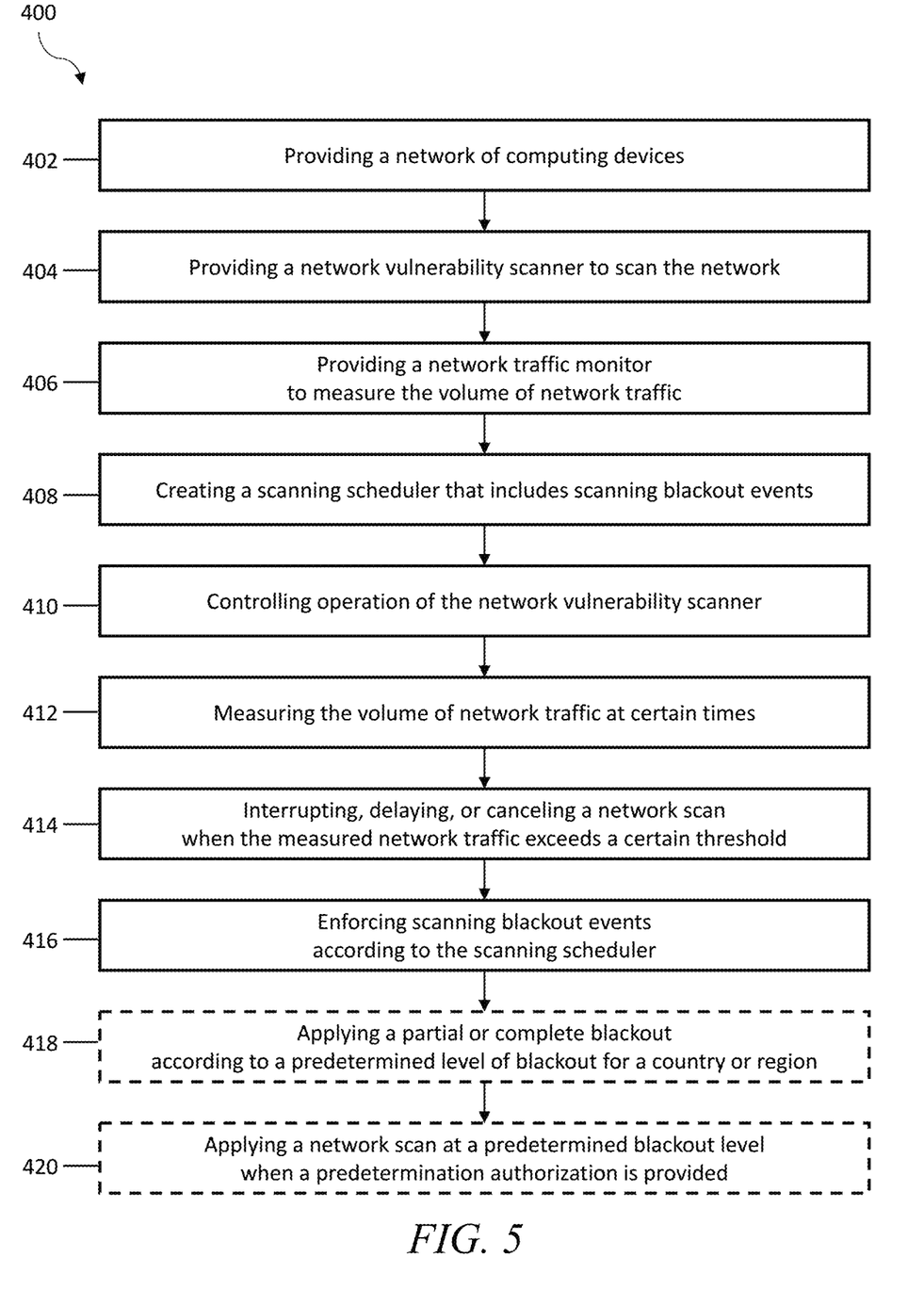
FIG. 5 is a flow diagram in accordance with some embodiments.

FIG. 5 shows a process 400 for managing network vulnerability scanning to avoid interference and disruption of ongoing operations. As addressed above, it is generally contemplated that one or more networks are scheduled for scanning on a periodic basis to seek to prevent potential hacking and other unauthorized intrusions on the network(s). It is desirable to impose blackouts on this scanning at various times in various countries and regions in order to try to minimize potential disruption of the network(s). It is generally contemplated that this process 400 may use any of the systems or components described above.

At block 402, a network of computing devices is provided. It is generally contemplated that these computing devices are communicatively coupled to the network. Further, in one form, the network provided is used in retailer operations, such as, for example, online and in-store sales of merchandise to customers. In addition, it is contemplated that this network will be periodically scanned to try to reduce its vulnerabilities and insecurities to malevolent actions by outside actors. In one form, this network may be just one of many networks controlled and operated by a retailer around the world, all of which may require periodic network scanning.

At block 404, a network vulnerability scanner to scan the network is provided. Any of various types of scanners may be used, including certain conventional vulnerability scanning tools and software created by, for example, McAfee, Tenable, and IBM. In one form, the scanner may interrogate the network from outside the network, such as by seeking to access files, query network ports, and perform login actions. In another form, the scanner may also evaluate the network from inside the network, such as by scanning nodes using login credentials on the network; performing measurements indicating usage capacity on a node or on the network; and determining one or more of conflicting application operations, misconfigurations of the applications, and internal application vulnerabilities.

At block 406, a network traffic monitor is provided to measure the volume of network traffic. In one form, as addressed further below, it is contemplated that the network traffic will be measured to make sure that the scan does not occur when there is already a high volume of network traffic. A network disruption or crash at this high volume point in time would have a significant impact and might, as one example, prevent a large number of online and/or in-store customers from engaging in and/or completing sales transactions. Any of various network traffic monitor tools and techniques may be used, including, without limitation, router-based monitoring techniques, data packet capture and analysis, simple network management protocol, and/or the measurement of bandwidth use on individual computing devices and routers.

At block 408, a scanning scheduler is created that includes scanning blackout events, i.e., events when scanning is limited or prohibited. Each scanning blackout event includes: an event name, an applicable country or region for the blackout, a blackout start time, a blackout end time, and a blackout type. The blackout type indicates the level of the blackout in the country or region (for example, the blackout may only be a partial blackout) and/or the authorization required for the network scan to proceed. It is generally contemplated that the scanning scheduler may be continually and iteratively updated with new blackout events or revisions to previously scheduled blackout events.

At block 410, the operation of the network vulnerability scanner is controlled so that it scans network(s) when there is relatively low network traffic and at the times and in the manner permitted by the scanning scheduler. At block 412, the volume of traffic in a network is measured at certain times. For example, it may be measured periodically, such as every hour, every day, or at some other regular interval of time. It is generally contemplated, as an initial step, that scanning will proceed only if the volume of network traffic is sufficiently low. If the volume of network traffic is below a certain threshold, the scan may proceed. However, as shown at block 414, if the network traffic exceeds a certain threshold, the scan will be interrupted, delayed, or canceled. In one form, it is contemplated that the scan may be rescheduled to the next time when network traffic is below the threshold and when there is no blackout event.

At block 416, the scanning blackout events are enforced according to the scanning scheduler. In one form, it is contemplated that the network traffic has been determined to be of a sufficiently low volume for the scan to proceed, but the scanning scheduler still must be consulted to determine if a blackout exists and the nature of the blackout. It is contemplated that various types of blackouts are created, which may determine the extent of the blackout (such as partial or complete) and/or the authorization required for the network scan to proceed.

For example, at block 418, a partial or complete blackout may optionally be applied according to a predetermined level of blackout for a country or region. As described above, these blackout levels may include the following examples of levels: scans will generally run during an event; scans will generally not run or will cease during an event; scans or changes have been frozen for a department or portion of a network; scans being permitted only during a certain time period; or only manually inputted and non-recurring network scans are allowed. In addition, certain authorizations may be required for different blackout levels. Some blackout levels may require no authorization at all in order for a scan to proceed, while other levels may require authorization from an individual in a high position of authority. At block 420, optionally, a network scan may be applied at a predetermined blackout level only when a predetermined authorization is provided (such as, for example, manager, supervisor, vice-president, etc.).

Figure 6:
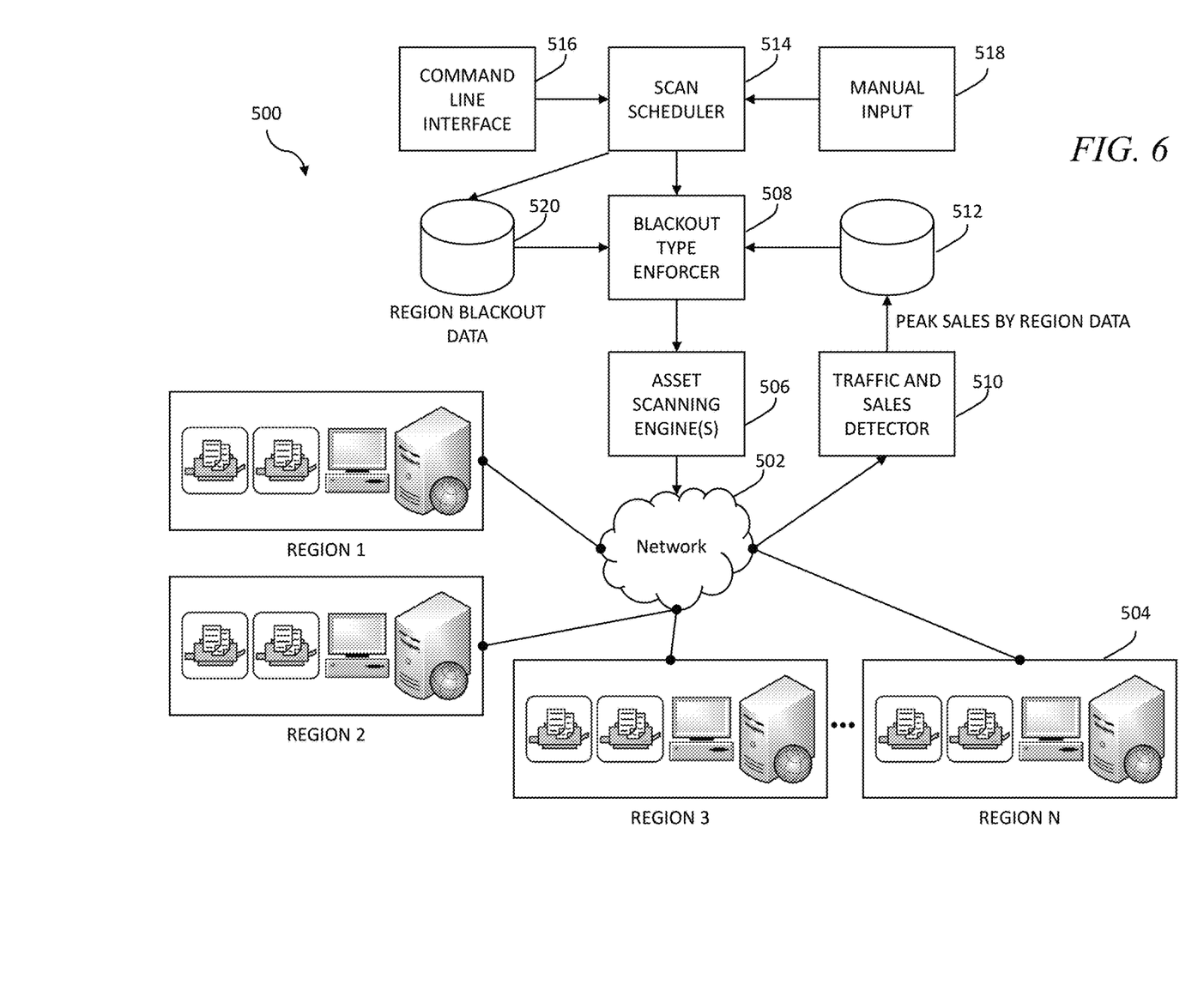
FIG. 6 is a schematic diagram in accordance with some embodiments.

Referring to FIG. 6, there is shown another system 500 for controlling a network vulnerability scanner to try to minimize disruption of ongoing operations. Generally, the system uses a network traffic monitor to avoid running scans during high traffic times and a scanning scheduler to avoid or limit the running of scans during blackout events. The system 500 is similar to system 100 addressed above and the description above is incorporated herein. Further, the system 500 may operate in accordance with the process 400 addressed above.

The system 500 includes a network or networks 502 of computing devices 504. As shown in FIG. 6, in one form, it is contemplated that the network(s) 502 may cover a number N different regions. These regions may encompass different time zones and different countries. As should be evident, where different time zones are involved, the system 500 applies scanning blackouts in accordance with the local time for that region. In this form, it is contemplated that the network(s) 502 cover operations in different regions, such as, for example, online and in-store sales of merchandise to customers.

The scanning operations are performed by the asset scanning engine(s) 506 (or network vulnerability scanner). It is generally contemplated that one or more scanning engines may be used to perform the vulnerability scanning of the network (or parts of the network) in various regions at various times. As addressed above, various conventional types of scanning engines and software tools may be used. In one form, the scanner may interrogate the network(s) 502 (or part of it) from outside the network(s) 502, while in another form, the scanner may also evaluate the network(s) 502 (or parts thereof) from inside the network(s) 502.

The scanning operations are controlled by a blackout type enforcer 508 (or control circuit). It is generally contemplated that the enforcer 508 considers both network traffic/sales and scheduled blackout events in determining how and when network scans should run. Regarding network traffic/sales, the system 500 includes a traffic and sales detector 510 (or network traffic monitor) to determine network traffic and sales. The traffic and sales detector 510 may be used to conduct real time measurements of network traffic and sales and/or to establish long term trends and data regarding peak sales at various regions, as shown at block 512. The blackout type enforcer 508 may use these real time measurements and/or long term trend data to interrupt, delay, or cancel scans that would otherwise occur during periods of high network traffic and sales.

Regarding scheduled blackout events, a scan scheduler 514 is used to keep track of blackout events, including the nature and type of blackouts. As addressed above, various types of blackouts may be created for different regions, and these blackout types may determine the extent of the blackout (such as partial vs. complete) and/or the authorization required for the network scan to proceed (or to override a scheduled blackout). The above description of some examples of blackout types, levels, and authorizations is incorporated herein, including, without limitation, the examples shown and described in FIG. 3.

The scan scheduler 514 and the blackout events on the scan scheduler 514 may be created and inputted in various ways. For example, they may be created and inputted by command line interface 516, by manual input 518, or by any other suitable manner. As shown at block 520, there may also be a database of specific blackout events for different regions, such as, for example, local holidays and anniversary dates of previous disruptions to operations in a particular region. In one form, for example, blackout events may be inputted and created consistent with the table and data fields shown in FIG. 4.

As addressed above, it should be understood that this disclosure may be applied to both retail and non-retail operations. As a general matter, this disclosure may be applied broadly to any subject matter where the control of vulnerability scanning is useful to avoid possibly interfering with and disrupting ongoing network operations. Some examples of the applicability to retail operations have been described above. Other examples of possible non-retail areas have also been addressed, including, without limitation, air traffic control systems, video streaming services, and military applications. As should be evident, there are numerous retail and non-retail examples to which this disclosure may be applied, and this disclosure should not be understood to be limited to any particular setting.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for managing network vulnerability scanning to avoid interference and disruption of network operations, the system comprising:
   a network comprising a plurality of communicatively coupled computing devices with applications running thereon;
   a network vulnerability scanner configured to evaluate insecurity and vulnerability of the network to disruption by outside actors;
   a scanning scheduler comprising a plurality of scanning blackout events limiting operation of the network vulnerability scanner, each scanning blackout event including an event name, a blackout start time, a blackout end time, and a blackout type selected from a plurality of predetermined blackout types, each blackout type indicating a permitted degree of network scanning and a predetermined degree of authorization required to override the scanning blackout event the plurality of predetermined blackout types including at least a department type;
   a control circuit operatively coupled to the network vulnerability scanner and the scanning scheduler, the control circuit configured to:
     control operation of the network vulnerability scanner; and
     enforce scanning blackout events according to the scanning scheduler.

2. The system of claim 1, wherein:
   the scanning scheduler is coupled to at least one additional network vulnerability scanner, the network vulnerability scanner and the at least one additional network vulnerability scanner being disposed in at least two countries; and
   the control circuit is configured to transmit instructions to enforce scanning blackout events according to the scanning scheduler in the at least two countries.

3. The system of claim 1, further comprising:
   a network traffic monitor configured to measure volume of traffic being transferred across the network at a certain point in time, the network traffic monitor being operatively coupled to the control circuit;
   wherein the control circuit is configured to interrupt, delay, or cancel a network scan by the network vulnerability scanner when the network traffic measured by the network traffic monitor exceeds a predetermined threshold.

4. The system of claim 3, wherein, following interruption, delay, or cancellation of a network scan when measured network traffic exceeds a predetermined threshold:
the network traffic monitor is configured to continue measuring the volume of traffic being transferred across the network at predetermined time intervals; and
the control circuit is configured to initiate a network scan when both the volume of traffic no longer exceeds the predetermined threshold and the scanning scheduler does not indicate a blackout event.

5. The system of claim 3, wherein:
the control circuit is configured to determine a rate in change of the volume of traffic measured by the network traffic monitor; and
the control circuit is configured to interrupt, delay, or cancel a network scan when the rate in the change of the volume of traffic exceeds a predetermined threshold rate.

6. The system of claim 1, wherein:
the control circuit is configured to receive input that a network scan disrupted network operations on a certain date in a country or region; and
the control circuit is configured to create a scanning blackout event in that country or region on anniversaries of that certain date.

7. The system of claim 1, wherein:
for the department type of blackout type, network scans are only permitted for at least one predetermined department of the network being scanned.

8. The system of claim 1, wherein:
for the department type of blackout type, network scans are not permitted for a department of the network being scanned.

9. The system of claim 1, wherein the network vulnerability scanner is further configured to evaluate insecurity and vulnerability by:
scanning nodes using login credentials on the network;
performing a plurality of measurements indicating usage capacity on a node or on the network; and
determining one or more of conflicting application operations, misconfigurations of the applications, and internal application vulnerabilities.

10. A system for managing network vulnerability scanning to avoid interference and disruption of network operations, the system comprising:
a network comprising a plurality of communicatively coupled computing devices with applications running thereon;
a network vulnerability scanner configured to evaluate insecurity and vulnerability of the network to disruption by outside actors;
a scanning scheduler comprising a plurality of scanning blackout events limiting operation of the network vulnerability scanner, each scanning blackout event including an event name, a blackout start time, a blackout end time, and a blackout type selected from a plurality of predetermined blackout types, each blackout type indicating a permitted degree of network scanning and a predetermined degree of authorization required to override the scanning blackout event; and
a control circuit operatively coupled to the network vulnerability scanner and the scanning scheduler, the control circuit configured to:
control operation of the network vulnerability scanner; and
enforce scanning blackout events according to the scanning scheduler;
a network traffic monitor configured to measure volume of traffic being transferred across the network at a certain point in time, the network traffic monitor being operatively coupled to the control circuit;
wherein:
the control circuit is configured to interrupt, delay, or cancel a network scan by the network vulnerability scanner when the network traffic measured by the network traffic monitor exceeds a predetermined threshold;
the network traffic monitor measures daily traffic in one or more countries or regions;
the control circuit is configured to determine whether the measured daily traffic in the one or more countries or regions exceeds predetermined thresholds for those one or more countries or regions; and
the control circuit is configured to create a scanning blackout event for those one or more countries or regions on anniversaries of dates where the measured daily traffic exceeded the predetermined thresholds.

11. A method for managing network vulnerability scanning to avoid interference and disruption of network operations, the method comprising:
providing a network comprising a plurality of communicatively coupled computing devices with applications running thereon;
providing a network vulnerability scanner configured to evaluate insecurity and vulnerability of the network to disruption by outside actors;
creating a scanning scheduler comprising a plurality of scanning blackout events limiting operation of the network vulnerability scanner, each scanning blackout event including an event name, a blackout start time, a blackout end time, and a blackout type selected from a plurality of predetermined blackout types, each blackout type indicating a permitted degree of network scanning and a predetermined degree of authorization required to override the scanning blackout event, the plurality of predetermined blackout types including at least a department type; and
by a control circuit:
controlling operation of the network vulnerability scanner; and
enforcing scanning blackout events according to the scanning scheduler.

12. The method of claim 11, wherein:
the scanning scheduler is coupled to at least one additional network vulnerability scanner, the network vulnerability scanner and the at least one additional network vulnerability scanner being disposed in at least two countries; and
the control circuit transmits instructions to enforce scanning blackout events according to the scanning scheduler in the at least two countries.

13. The method of claim 11, further comprising:
providing a network traffic monitor configured to measure volume of traffic being transferred across the network at a certain point in time, the network traffic monitor being operatively coupled to the control circuit; and
by the control circuit, interrupting, delaying, or canceling a network scan by the network vulnerability scanner when the network traffic measured by the network traffic monitor exceeds a predetermined threshold.

14. The method of claim 13, further comprising:

by the network traffic monitor, measuring daily traffic in one or more countries or regions;

by the control circuit, determining whether the measured daily traffic in the one or more countries or regions exceeds predetermined thresholds for those one or more countries or regions; and by the control circuit, creating a scanning blackout event for those one or more countries or regions on anniversaries of dates where the measured daily traffic exceeded the predetermined thresholds.

15. The method of claim 13, further comprising, following interruption, delay, or cancellation of a network scan when measured network traffic exceeds a predetermined threshold:

by the network traffic monitor, continuing to measure the volume of traffic being transferred across the network at predetermined time intervals; and by the control circuit, initiating a network scan when both the volume of traffic no longer exceeds the predetermined threshold and the scanning scheduler does not indicate a blackout event.

16. The method of claim 13, further comprising:

by the control circuit, determining a rate in change of the volume of traffic measured by the network traffic monitor; and by the control circuit, interrupting, delaying, or canceling a network scan when the rate in the change of the volume of traffic exceeds a predetermined threshold rate.

17. The method of claim 11, further comprising:

by the control circuit, receiving input that a network scan disrupted network operations on a certain date in a country or region; and by the control circuit, creating a scanning blackout event in that country or region on anniversaries of that certain date.

18. The method of claim 11, wherein:

for the department type of blackout type, scans are only permitted for at least one predetermined department of the network being scanned.

19. The method of claim 11, wherein:

for the department type of blackout type, network scans are not permitted for a department of the network being scanned.

20. The method of claim 11, wherein the network vulnerability scanner is further configured to evaluate insecurity and vulnerability by:

scanning nodes using login credentials on the network;

performing a plurality of measurements indicating usage capacity on a node or on the network; and determining one or more of conflicting application operations, misconfigurations of the applications, and internal application vulnerabilities.

\* \* \* \* \*